United States Patent [19]

Kimura

[11] 4,251,149
[45] Feb. 17, 1981

[54] VIEWFINDER MASK ORIENTING DEVICE IN A CAMERA

[75] Inventor: Mitsuyuki Kimura, Kasukabe, Japan

[73] Assignee: Mamiya Koki Kabushiki Kaisha, Tokyo, Japan

[21] Appl. No.: 81,136

[22] Filed: Oct. 2, 1979

[51] Int. Cl.³ .............................................. G03B 13/10
[52] U.S. Cl. .................................................. 354/222
[58] Field of Search ............... 354/159, 160, 222, 121; 355/74

[56] References Cited

U.S. PATENT DOCUMENTS

| | | | |
|---|---|---|---|
| 1,991,924 | 2/1935 | Dolan | 354/222 X |
| 2,295,801 | 9/1942 | Nagel | 354/159 |
| 2,719,468 | 10/1955 | Steiner | 354/222 X |

Primary Examiner—Donald A. Griffin
Attorney, Agent, or Firm—Robert E. Burns; Emmanuel J. Lobato; Bruce L. Adams

[57] ABSTRACT

In the viewfinder optical system of a reflex camera with a film holder which is rotatable to change the orientation of the oblong image on its film, a viewfinder mask orienting device supporting a square focusing screen has two pairs of rotatable masking blades, the two blades of each pair being integrally joined in Vee shape, which are actuated by the rotation of the film holder to operate cooperatively to alternately mask edge parts of the two pairs of opposed sides of the focusing screen thereby to form an oblong viewfinder image and change the orientation of this image to conform to that of the image on the film.

4 Claims, 10 Drawing Figures

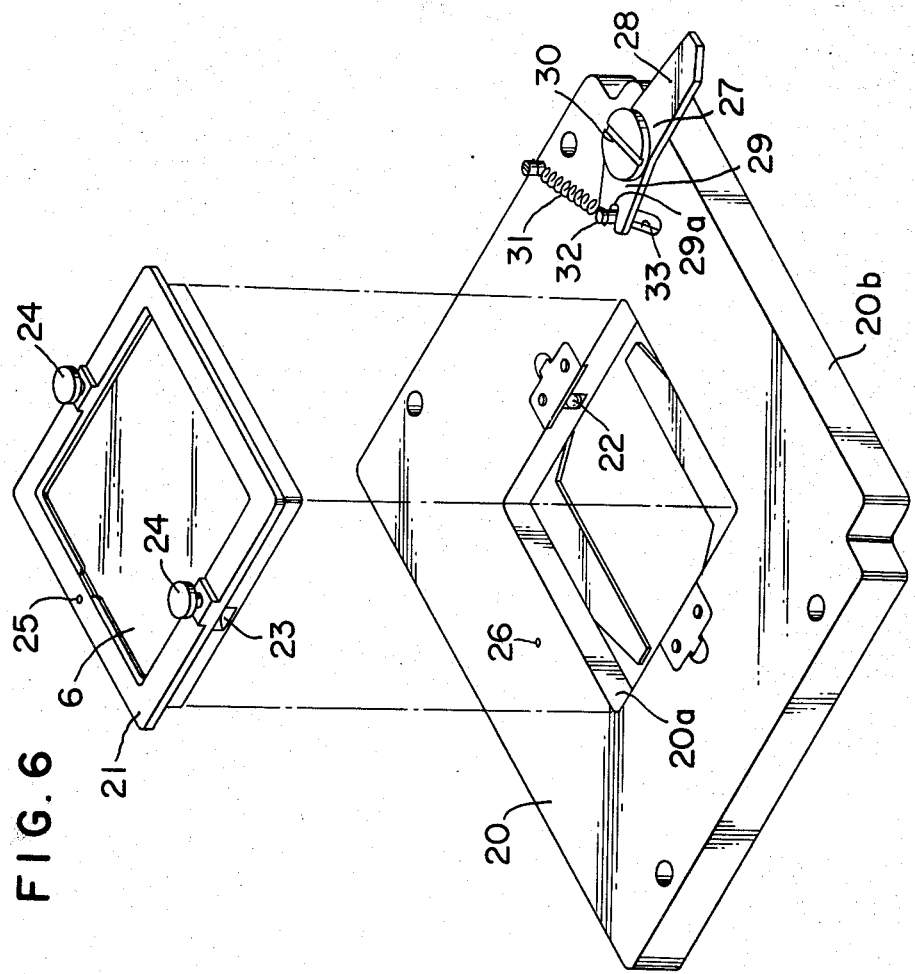
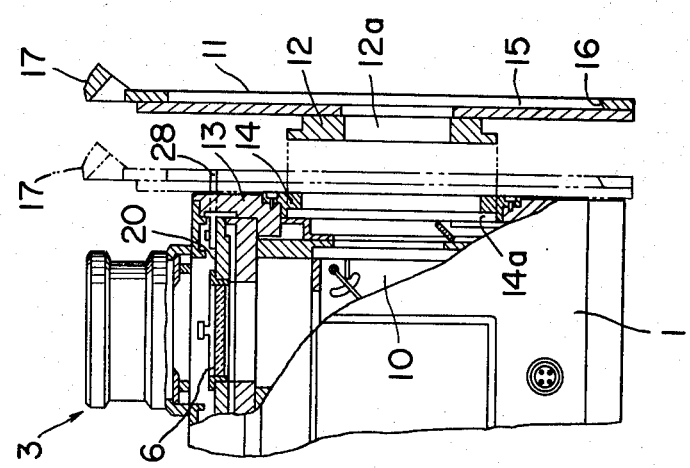

VIEWFINDER MASK ORIENTING DEVICE IN A CAMERA

BACKGROUND OF THE INVENTION

This invention relates generally to photographic cameras and more particularly to a viewfinder mask orienting device in a camera.

While some cameras, principally twin-lens reflex cameras, are adapted to take square pictures, most present-day cameras take rectangular pictures having long and short dimensions. That is, the light beam projected by the photographic optical system toward the film is masked to form an oblong image on the film, the direction of the longer dimension of the image being either parallel or perpendicualr to the longitudinal direction of the film. An object being photographed can be photographed with its vertical direction coinciding with either the longer dimension or shorter dimension of the image projected on the film by correspondingly orienting the entire camera or by correspondingly orienting only the film holder of the camera in certain cameras.

On one hand, the orientation of the longer and shorter sides of the rectangular image observable in the viewfinder must correspond to this orientation of the image projected on the film. This presents no problem in the case of a camera which is turned between its upright state and its horizontal state for this orientation. In some cameras such as certain portrait cameras, however, only the film holder is rotated for this orientation. In such cameras, the orientation of the longer and shorter sides of the image observable in the viewfinder must be made changeable to correspond to the orientation of the film holder, that is, the film.

SUMMARY OF THE INVENTION

It is an object of this invention to provide, in a photographic camera having a film holder which is rotatable about the camera optical axis relative to the other parts of the camera as mentioned above, a viewfinder mask orienting device by which the orientation of the longer and shorter sides of the viewfinder image is automatically changed in the above described manner by the rotation of the film holder.

Another object of the invention is to provide a device as stated above which is of simple and compact construction and reliable operation.

Still another object of the invention is to provide a device as stated above which supports a focusing screen in a manner which facilitates the replacement or interchanging of the focusing screen.

According to this invention, briefly summarized, there is provided, in a photographic camera having a viewfinder optical system with a square focusing screen and a film holder which is rotatable to change the orientation of the oblong optical image of a photographed object projected on its film, a viewfinder mask orienting device comprising: a base plate disposed in the viewfinder optical system and supporting the focusing screen in optical axial alignment with the system on that side of the base plate affording greater facility in interchanging of the screen; two pairs of masking blades which are movably supported on the base plate at its side opposite to the above side and are cooperatively operable to alternately mask edge parts of the two pairs of opposed sides of the square focusing screen thereby to form an oblong viewfinder image of the object and change the orientation of the same image to conform to that of the image on the film; and a mechanism actuated by the rotation of the film holder to thus operate the two pairs of the masking blades.

The nature, utility, and further features of the invention will be more fully apparent from the following detailed description with respect to a preferred embodiment of the invention when read in conjunction with the accompanying drawings, which are briefly described below.

BRIEF DESCRIPTION OF THE DRAWINGS

In the drawings:

FIG. 5 is a partly exploded left side elevation, with some parts shown in vertical section, showing details of the film holder mounting plate and the manner in which it is rotatably assembled in the camera;

FIG. 6 is a partly exploded perspective view showing the top, left side, and rear of one example of the viewfinder mask orienting device of the invention;

DETAILED DESCRIPTION OF THE INVENTION

Figure 1:
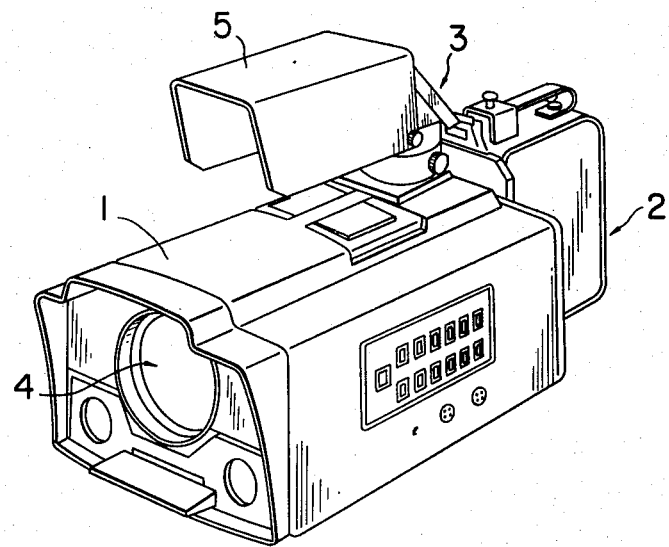
FIG. 1 is a perspective view showing the front, left side, and top of a single-lens reflex camera which is an example of a camera in which the viewfinder mask orienting device of the invention can be applied.
Figure 2:
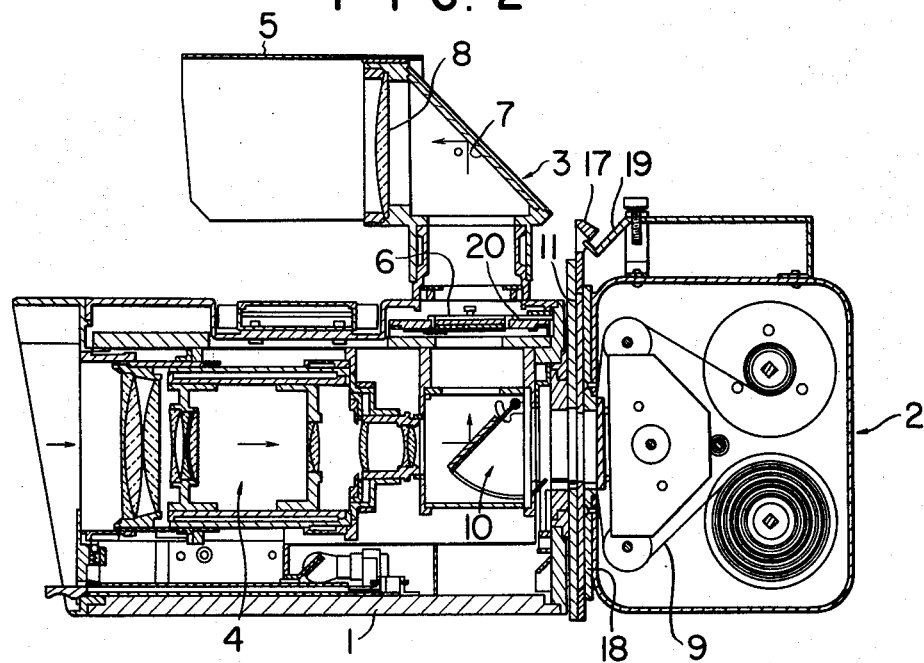
FIG. 2 is a left side elevation, in vertical section, showing the essential construction of the same camera.

The viewfinder mask orienting device of this invention is applicable to a camera in which the viewfinder has a ground-glass focus screen and an orientable film holder such as, for example, a single-lens reflex camera as illustrated in FIGS. 1 and 2. This camera has a main camera housing 1 and a film magazine 2 containing a film 9 and detachably secured to the rear face of the housing 1. The housing 1 houses a photographic optical system 4 and a mirror shutter device 10 interposed between the photographic optical system 4 and the rear face of the housing 1. A finder 3 is mounted on the housing 1 above the mirror shutter device 10 and has a finder optical system including a focusing glass or screen 6, which in this example is a Fresnel lens ground glass, a viewer mirror 7, and a viewer lens 8. In this example, the supporting and housing structure for the viewer mirror 7, and the lens 8 is of turret type, being swivelable relative to the housing 1. The finder 3 is further provided with a hood 5.

Figure 3:
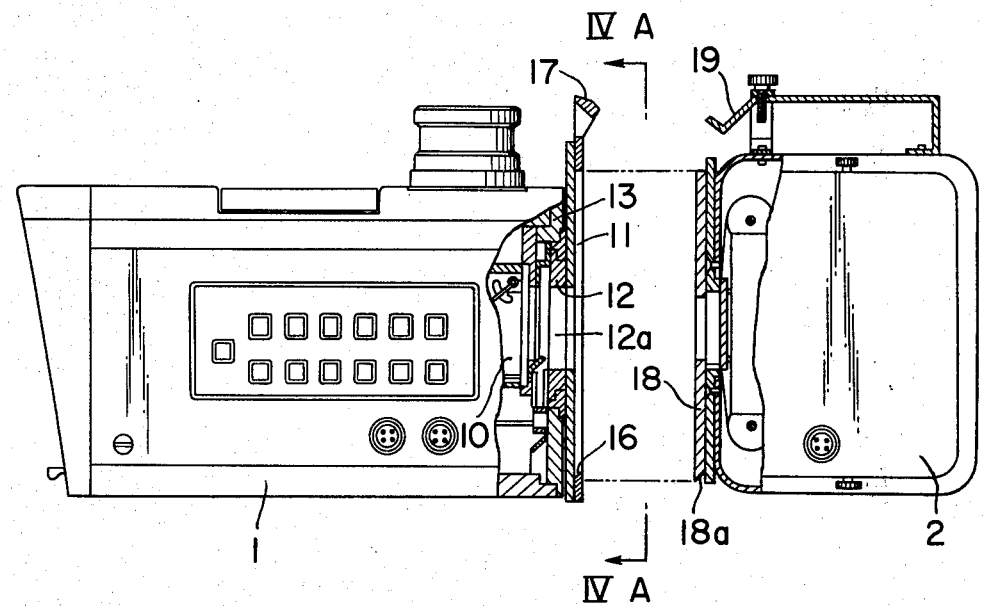
FIG. 3 is a left side elevation showing the rotatable film holder detached from the main camera housing.

As mentioned above, the film magazine 2 is detachably secured to the rear face of the housing 1. As shown in FIG. 3, a rotatable mounting plate 11 is provided on the rear wall 13 of the housing 1. As illustrated in FIG. 5, the mounting plate 11 has a flanged rotary disk 12 integrally fixed thereto and rotatably fitted in a circular recess 14a in the rear face of the rear wall 13 of the camera housing 1, the rotary disk 12 being retained in this fitted state by a retaining ring 14 fixed to the rear wall 13. The mounting plate 11, which is thus rotatably joined to the camera housing 1, and its rotary disk 12 have a centrally disposed rectangular aperture 12a for passage of image-forming light rays from the photographic optical system 4 to the film 9 in the film magazine 2 at the time of exposure. The mounting plate 11 further has a shallow rectangular recess 15 with an inwardly-beveled lower edge 16. A latch receptacle 17 is fixed to the mounting plate 11 at the top thereof.

The film magazine 2 is provided at its front face with a rectangular fitting plate 18 adapted to fit into the recess 15 of the mounting plate 11 and having an inwardly-beveled lower edge 18a for engagement with the beveled edge 16 of the mounting plate 11. The film magazine 2 is provided at its upper front part with a spring latch 19. In the procedure of mounting the film magazine 2 on the camera housing 1, the magazine 2 in a slightly rearwardly tilted state is brought to the rear face of the camera housing 1, and the beveled edge 18a is fitted into engagement with the beveled edge 16. The magazine 2 is then tilted forward about the engaged beveled edges 18a and 16, whereupon the spring latch 19 clicks into engagement with the latch receptacle 17, and the magazine 2 is securely secured to the mounting plate 11 with the fitting plate 18 snugly fitted in the recess 15.

Figure 4A:
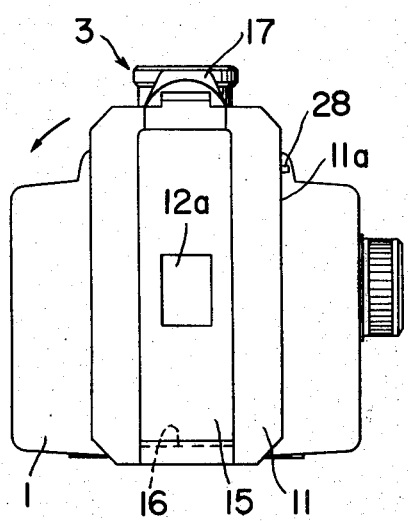
FIG. 4A is a rear elevation as viewed in the arrow direction in the plane indicated by line IVA—IVA in FIG. 3, showing a rotatable mounting plate for the film holder in vertical position.

When the film magazine 2 is in its upright position as shown in FIGS. 1, 2, and 3, the mounting plate 11 is in its upright or vertical position as shown in FIG. 4A, in which the longer dimension of the aperture 12a is also vertical. It is assumed that, in the instant example, the longer dimension of each picture frame of the film 9 is in the longitudinal direction of the film. When a picture is taken with the film magazine 2 in this upright state, the vertical direction of the photographed image is parallel to the longer dimension of the aperture 12a and to the longer dimension of the picture frame of the film 9.

When it is desired to take a picture in which the vertical direction of the image to be photographed is perpendicular to the longer dimension of the picture frame, the film magazine is rotated counterclockwise, as viewed from rear to front, through an angle of 90 degrees. As a consequence, the mounting plate 11 is similarly rotated to assume the state shown in FIG. 4B. The aperture is then orientated as shown with its longer dimension in the horizontal direction.

As mentioned hereinbefore, it is necessary to indicate in the viewfinder the exact perimeter of the image field to be projected on the film. This can accomplished by means of a so-called finder mask having a rectangular aperture in which the image field to be projected on the film appears. In a camera of the above described character having a rotatable film magazine, however, this rectangular aperture of the finder mask must be orientable to present an image field in the finder conforming to that to be projected onto the film.

This orienting of the finder mask aperture is accomplished by the viewfinder mask orienting device according to this invention, one embodiment of which will now be described in conjunction with FIGS. 6, 7A, 7B, and 8.

Most of the moving parts of the viewfinder mask orienting device are accommodated in a recess in the bottom face of a base plate 20, which is positioned above the mirror shutter device 10 as indicated in FIG. 2 and serves also as a support for the focusing glass 6 of square shape in plan view. As shown in FIG. 6, the focusing glass 6, which is a Fresnel lens, is held by a square focus glass frame 21, which fits snugly from above into a square through hole 20a formed centrally in the base plate 20 and is held in place by click balls 22 in opposite edges of the square hole, engaging corresponding click slots 23 in the frame 21. The frame 21 is provided on opposite sides thereof with knobs 24 for lifting and lowering the frame 21 and focusing glass 6 out of and into the square hole 20a in the base plate 20. The frame 21 and the base plate 20 are respectively provided with matching marks 25 and 26 for indication of correct mutual orientation of the frame 21 and the base plate 20 at the time of assembly or replacement of the focus glass.

Figure 7A:
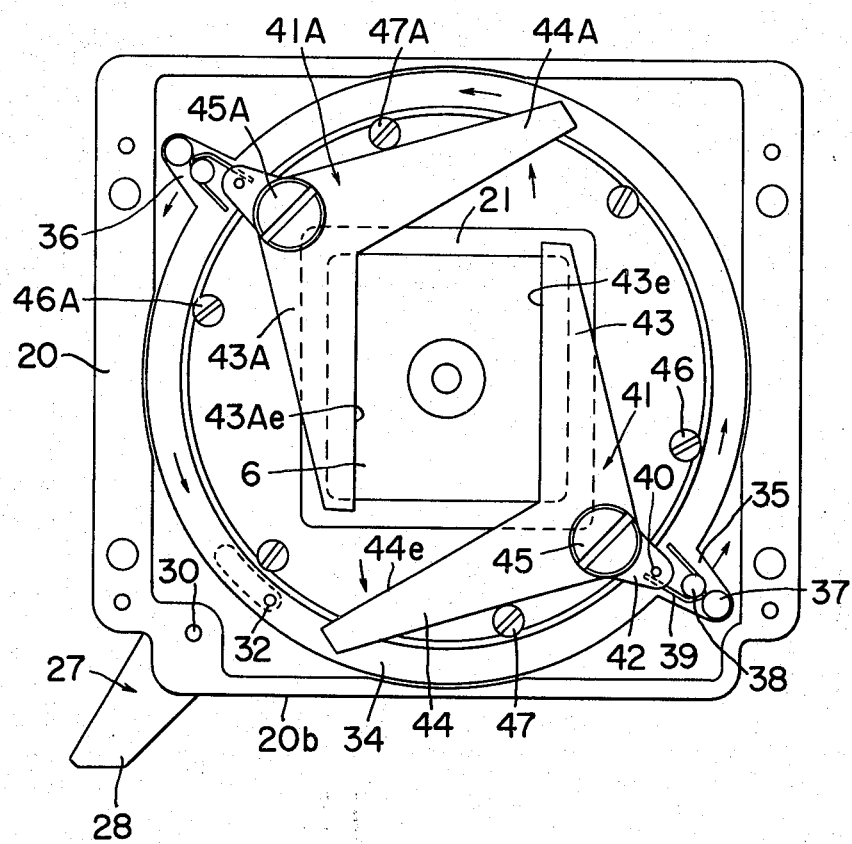
FIG. 7A is a bottom view of the device illustrated in FIG. 6 showing masking blades in positions to produce an oblong viewfinder image with its longer sides parallel to the vertical direction of the object being photographed.
Figure 7B:
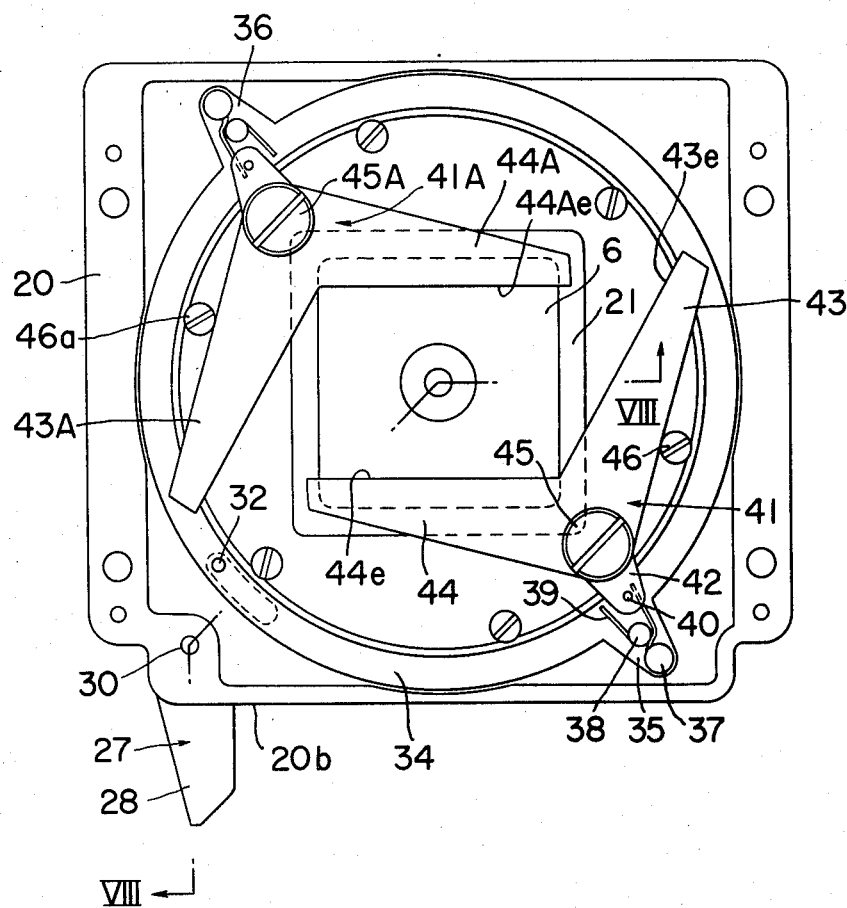
FIG. 7B is a similar bottom view showing masking blades in positions to produce a viewfinder image with its shorter sides parallel to the vertical direction of the object.
Figure 8:
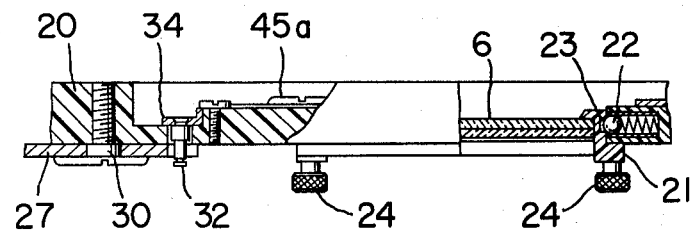
FIG. 8 is sectional view taken along a bent plane indicated by the bent line VIII—VIII in FIG. 7B as viewed normally to the bent plane generally in the arrow directions.

The lower right edge 20b of the base plate 20 as seen in FIG. 6 is the rear edge thereof and is horizontal and perpendicular to the optical axis of the camera when the base plate 20 is in assembled state in the camera. Near the rear right corner of the base plate 20, on the upper surface thereof, is provided an orienting lever 27 having two arms 28 and 29 and pivotally supported between these two arms by a pivot screw 30 fixed to base plate 20. A slot 29a is formed at the outer end of the arm 29, which thereby has the shape of a fork or yoke. An upright pin 32 extends downwardly through an arcuate slot 33 formed through the base plate 20 and is embeddedly fixed at its lower end to an orienting ring 34 provided on the lower surface of the base plate 20 as shown in FIGS. 7A and 7B. A tension spring 31 is connected at one end thereof to the upper end of the pin 32 and is anchored at its other end to a part of the base plate 20, imparting a force which continually urges the lever 27 to turn in the clockwise direction as viewed from above.

The orienting ring 34 is slidable accommodated within an annular recess concentrically disposed relative to the focus glass 6 and constituting a contiguous part of the aforementioned recess formed in the bottom face of the base plate 20. Rotation of the lever 27, as described hereinafter, is transmitted by way of the pin 32 to move the orienting ring 34 in sliding rotation in the annular recess through a relatively small angular displacement. The orienting ring 34 is provided at two diametrically opposite positions thereof with outwardly extending projections 35 and 36, respectively.

Each projection, for example, the projection 35, is provided thereon with two stud pins 37 and 38 embeddedly fixed thereto. A coupling spring 39 is wound around these stud pins 37 and 38 and is engageable with a stud pin 40 embeddedly fixed to the outer end of a short arm 42 of a Y-shaped lever 41. The other two arms of this Y-shaped lever 41 respectively constitute a first masking blade 43 and a second masking blade 44. The Y-shaped lever 41 is pivotally supported at the juncture of its arms 42, 43, and 44 by a pivot screw 45, which is fixed to the base plate 20 at a position inside of the orienting ring 34 and close to the rear-left corner of the aforedescribed focus glass frame 21.

The other projection 36 of the orienting ring 34 is coupled in exactly the same manner to a Y-shaped lever 41A identical to the Y-shaped lever 41 and having identical first and second masking blades 43A and 44A. This Y-shaped lever 41A is pivotally supported in exactly the same manner by a pivot screw 45A, which is fixed to the base plate 20 at a position inside of the orienting ring 34 and close to the front-right corner of the focusing glass frame 21. Thus, the pivot screws 45 and 45A are on diametrically opposite sides relative to the center of the orienting ring 34, and of the focusing glass 6, and, at the same time, are near diagonally opposite corners of the focus glass frame 21.

The rotations of the Y-shaped lever 41 in the clockwise and counterclockwise directions (viewed from below as in FIGS. 7A and 7B) are limited by stops 46 and 47 fixed to the base plate 20 at positions to be contacted by the first and second masking blades 43 and 44, respectively. Similarly the rotations of the Y-shaped lever 41A are limited by stops 46A and 47A at positions to be contacted by the first and second masking blades 43A and 44A, respectively.

The edges of the first and second masking blades of each Y-shaped lever nearest the center of the focusing glass 6, for example, the edges 43e and 44e of the masking blades 43 and 44 are straight-line edges with an angle of the order of 120 degrees included therebetween and constitute framing edges.

The stop 47 is so preset that, when the Y-shaped lever 41 is in the angular position wherein its second masking blade 44 is in contact with and being stopped by the stop 47 as shown in FIG. 7A, the framing edge 43e of the first masking blade 43 is parallel to the front-to-rear direction of the camera and constitutes one of the long lateral sides of the mask aperture or frame. At this time, the masking blade 44A is in contact with and being stopped by its stop 47A. At the same time, the corresponding framing edge 43Ae of the masking blade 43A of the other Y-shaped lever 41A is in a position opposite and parallel to the framing edge 43e to form the opposite lateral side of the mask aperture. The two opposed masking blades 43 and 43A are then masking the lateral edge parts of the square focusing glass 6. That is, the distance between the opposed framing edges 43e and 43Ae of these blades 43 and 43A is less than the front-to-rear dimension of the mask aperture. Therefore, the longer dimension of the mask aperture corresponds to the upright direction of the object being photographed.

On the other hand, the stop 46 is so preset that, when the lever 41 is in the angular position wherein its first masking blade 43 is in contact with and being stopped by the stop 46 as shown in FIG. 7B, the framing edge 44e of the second masking blade 44 is perpendicular to the front-to-rear direction of the camera and forms the long rear side of the mask aperture. At the same time, the corresponding framing edge 44Ae of the masking blade 44A of the other Y-shaped lever 41A is in a position opposite and parallel to the framing edge 44e to form the long front side of the mask aperture. Thus, the direction of the shorter dimension of the mask aperture corresponds to the upright direction of the object being photographed.

The viewfinder mask orienting device of the above described construction according to this invention operates in the following manner.

When the camera is to be used with the film magazine 2 in the upright position as shown in FIGS. 1 and 2, the mounting plate 11 is also in the upright position as shown in FIG. 4A, in which its vertical right edge 11a has pressed the outer arm 28 of the orienting lever 27 toward the right to the limit of its rotation in the counterclockwise direction as viewed from above counter to the force of the spring 31. This rotation of the orienting lever 27 has consequently been transmitted through the pin 32 to cause the orienting ring 34 to undergo sliding rotation in the clockwise direction as viewed from above or in the counterclockwise direction as viewed from below as in FIG. 7A. Consequently, the sliding rotation of the ring 34 has been transmitted via the stud pins 37 and 38, the coupling spring 39, and the stud pin 40 and similarly via the corresponding stud pins and coupling spring to rotate the two Y-shaped levers 41 and 41A counterclockwise as viewed in FIG. 7A to the limits of their counterclockwise rotation as determined by the stops 47 and 47A.

Accordingly, the moving parts of the device are stopped in their respective states shown in FIG. 7A. That is, the longer dimension of the mask aperture is in the front-to-rear direction and therefore coincides with the orientation of the aperture 12a for projecting the image with its vertical direction coincident with the longitudinal direction of the film 9, that is, the longer dimension of the film frame.

Conversely, for projecting the image with its vertical direction perpendicular to the longitudinal direction of the film 9, that is, coincident with the shorter dimension of the film frame, the film magazine 2 is turned counterclockwise, as viewed from the rear toward the front, through 90 degrees of angle. Consequently, the mounting plate 11 is similarly turned to the angular position shown in FIG. 4B, releasing the outer arm 28 of the orienting lever 27. The lever 27 thereupon turns clockwise as viewed from above under the force of the spring 31, and this rotation is transmitted via the pin 32 to cause the orienting ring 34 to undergo sliding rotation in the clockwise direction as viewed from below as in FIG. 7B. Consequently, the related moving parts all undergo respective movements which are opposite to those described above and come to rest in their respective states shown in FIG. 7B, the masking blades 43 and 43A being stopped by their respective stops 46 and 46A.

Figure 4B:
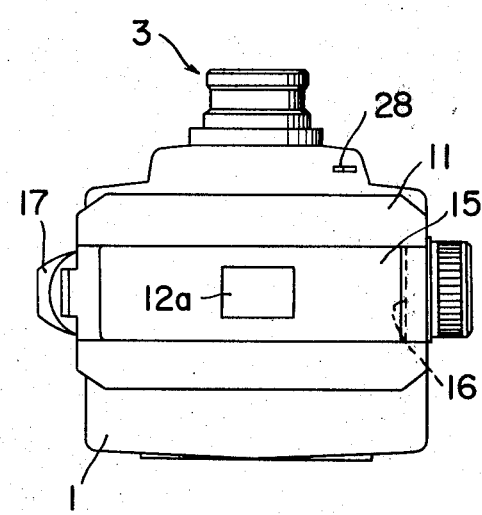
FIG. 4B is a rear elevation similar to FIG. 4A showing the film holder mounting plate rotated to its horizontal position to cause the vertical direction of the object being photographed to coincide with the shorter dimension of the rectangular image projected on the film.

The longer dimension of the mask aperture is now in the direction perpendicular to the front-to-rear direction, which coincides with the orientation of the aperture 12a as shown in FIG. 4B for projecting the image with its vertical direction coincident with the shorter dimension of the film frame.

When the film magazine 2 is again turned to its upright position, the edge 11a of the mounting plate 11 again contacts the outer arm 28 of the orienting lever 27 and forces it to the right, whereupon the previously described operation is carried out to place the moving parts of the device in their respective states shown in FIG. 7A.

As mentioned hereinbefore, an important feature of the viewfinder mask orienting device of this invention is that the Fresnel lens focusing glass 6, in its frame 21, is mounted on the upper part of the device, whereby the focus glass and its frame can be readily removed and replaced.

Although the viewfinder mask orienting device according to this invention has been described hereinbefore as having a square focusing screen, its shape need not necessarily be strictly square and may be a shape similar to a square. For example, it may take a shape in which the four corners of a square are removed or cut in an appropriate manner.

What is claimed is:

1. In a photographic camera having a viewfinder optical system with a square or substantially square focusing screen and a film holder mounted rotatably about the optical axis of the camera to change the orientation of an oblong optical image of a photographed object projected on its film, the combination therewith of a viewfinder mask orienting device comprising:

a base plate disposed in said viewfinder optical system and supporting said focusing screen in optical axial alignment with said optical system on that side of said base plate affording greater facility in interchanging of said focusing screen;

two Y-shaped levers each having two angularly disposed blade arms and one short arm, said levers being pivotally supported at their junctures of said three arms on said base plate near diagonally opposite corners of said focusing screen, each of said Y-shaped levers being pivotable between a first position at which one of the angularly disposed blade arms masks the edge part of its associated side of said focusing screen and a second position at which the other blade arm masks the edge part of its associated side of said focusing screen, one of the opposing blade arms of said Y-shaped levers masking one pair of opposed sides of said focusing screen at the same time in said first position, the other of said opposing blade arms of said Y-shaped levers masking the other pair of opposed sides of said focusing screen at the same time in said second position, said Y-shaped levers being disposed for cooperation to alternately mask edge parts of the two pairs of opposed sides of said focusing screen thereby to form an oblong viewfinder image of the object and change the orientation of the same image to conform to that of the image on the film; and transmission means interposed between said film holder and said short arms of said Y-shaped levers so as to be actuated by the rotation of said film holder to thus operate said Y-shaped levers.

2. A viewfinder mask orienting device according to claim 1 wherein said transmission means comprises an orienting ring concentrically encompassing said focusing screen and slidably supported by said base plate for sliding rotation, said short arm of each Y-shaped lever being connected to said orienting ring for conversion of the sliding rotation of said orienting ring into pivotal movements of said Y-shaped levers between their first and second positions, and an orienting lever pivotally supported on said base plate and joined at one end thereof to said orienting ring, the other end of said orienting lever being at a position to be actuated by the rotation of said film holder.

3. A viewfinder mask orienting device according to claim 2 wherein said short arm of each Y-shaped lever is connected to said orienting ring through spring means.

4. A viewfinder mask orienting device according to claim 1, comprising stop means on said base plate which are positioned to contact said blade arms to stop said pivotal movements of the Y-shaped levers in said first and second positions.

* * * * *